United States Patent
Kahrobaiyan et al.

(10) Patent No.: US 11,747,228 B2
(45) Date of Patent: Sep. 5, 2023

(54) DEVICE FOR MEASURING A FORCE EXERTED ON AN OBJECT

(71) Applicant: ECOLE POLYTECHNIQUE FEDERALE DE LAUSANNE (EPFL), Lausanne (CH)

(72) Inventors: Mohammad Hussein Kahrobaiyan, Neuchatel (CH); Charles Baur, St-Aubin (CH); Simon Henein, Neuchatel (CH); Mohamed Zanaty, Neuchatel (CH)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 137 days.

(21) Appl. No.: 17/602,817

(22) PCT Filed: Apr. 3, 2020

(86) PCT No.: PCT/EP2020/059521
§ 371 (c)(1),
(2) Date: Oct. 11, 2021

(87) PCT Pub. No.: WO2020/207911
PCT Pub. Date: Oct. 15, 2020

(65) Prior Publication Data
US 2022/0170804 A1 Jun. 2, 2022

(30) Foreign Application Priority Data
Apr. 10, 2019 (EP) .................................... 19168414

(51) Int. Cl.
*G01L 5/00* (2006.01)
*G01N 3/40* (2006.01)

(52) U.S. Cl.
CPC ............ *G01L 5/009* (2013.01); *G01L 5/0042* (2013.01); *G01N 3/40* (2013.01)

(58) Field of Classification Search
CPC .......... G01L 5/009; G01L 5/0042; G01N 3/40
See application file for complete search history.

(56) References Cited

U.S. PATENT DOCUMENTS 7,278,298 B2 * 10/2007 Hansma ................. G01Q 10/04
73/105
9,575,093 B2 * 2/2017 Beyeler ................. B81C 99/005
(Continued)

FOREIGN PATENT DOCUMENTS
WO    2017180968 A1    10/2017

OTHER PUBLICATIONS

Corresponding International Patent Application No. PCT/EP2020/059521, International Search Report and Written Opinion, dated Jun. 19, 2020.
(Continued)

*Primary Examiner* — Freddie Kirkland, III
(74) *Attorney, Agent, or Firm* — Cooper Legal Group LLC

(57) ABSTRACT

Device and method for measuring contact force exerted by an object on a probe comprising a lever and said probe for contacting the object is provided. The lever is pivotably coupled to a body by a coupling module. The device comprising a fixed frame coupled to the body. The body is designed to be moved with respect to the object to put the probe in contact with the object to create force pivoting said lever with respect to the body around a pivot axis. The device comprising a sensor for measuring displacement of the lever with respect to the body upon pivoting. The coupling module comprises control stiffness module, so that when the probe contacts the object, the displacement of the lever is proportional to the force exerted by the probe on the object. Such control stiffness module is tunable so that accuracy and sensitivity of measured force is controlled.

15 Claims, 3 Drawing Sheets

(56) References Cited

U.S. PATENT DOCUMENTS

| | | | |
|---|---|---|---|
| 11,085,945 B2* | 8/2021 | Joet | G01P 15/123 |
| 2003/0009898 A1* | 1/2003 | Slocum | G01M 5/005 |
| | | | 33/706 |
| 2006/0112760 A1* | 6/2006 | Hansma | G01Q 10/04 |
| | | | 73/105 |
| 2015/0204904 A1* | 7/2015 | Beyeler | G01R 1/44 |
| | | | 324/750.25 |
| 2019/0126498 A1* | 5/2019 | Schimmels | B25J 9/1005 |

OTHER PUBLICATIONS

Setti, et al., "Two-Dimensional Fine Particle Positioning Using a Piezoresistive Cantilever ad a Micro/Nan-Manipulator", Robotics and Automation, 1999 IEEE International Conference in Detroit MI May 10-15, 2019, vol. 4, pp. 2729-2735, May 10, 2019, Institute of Industrial Science, University of Tokyo Roppongi.

Y.F. Li, "A sensor-based robot transition control strategy", International Journal of Robotics Research, Apr. 1, 1996, vol. 15, No. 2, pp. 128-136.

Haitjema, et al., "A silicon-etched probe for 3-D coordinate measurements with an uncertainty below 0.1 um", IEEE Trans. Instrumentation and Measurement, vol. 50, Issue 6, Dec. 2001, pp. 1519-1523.

Yang, et al., "Design and simulation of a passive-type constant force MEMS microgripper", 2017 IEEE International Conference on Robotics and Biomimetics (ROBIO), 2017, pp. 1100-1105.

H. Hashimoto et al., "Two-dimentional fine particle positioning under an optical microscope using a piezoresistive cantilever as a manipulator", pp. 1-23, Institute of Industrial Science, University of Tokyo Roppongi.

S. Muntwyler, et al.,"Monolithically integrated two-axis micro tensile tester for the mechanical characterization of microscopic samples", Journal of Microelectromechanical Systems, vol. 19, Issue 5, pp. 1223-1233.

* cited by examiner

DEVICE FOR MEASURING A FORCE EXERTED ON AN OBJECT

TECHNICAL FIELD

The present invention relates to a device for measuring a contact force exerted by a probe on an object. The invention also concerns methods using said device.

BACKGROUND OF THE ART

Various approaches using a robotic system have been reported to control the contact between a probe and an object, (also called automated probe landing) notably for operating semiconductor or biological material.

The first approaches developed were adapted from known mechanical macro scale technologies. In the document from Y. F. Li., "*A sensor-based robot transition control strategy*", The International Journal of Robotics Research, 15, 128-136, 1996, the authors combined the proximity sensors with a force sensor placed close to the probe's tip. In the document from P. H. J. Schellekens et al., "*A silicon-etched probe for 3-D coordinate measurements with an uncertainty below 0.1 um*", IEEE Trans. Instrumentation and Measurement, 50, 1519-1523, 2001, a flexure mechanism was manufactured to measure 3D deflection of the probe in contact with a sample. However, these technologies were not adapted for advanced micro and nano operations that require better precision.

Another method based on electrical contact was developed. This method requires an electric potential difference between the probe and the landing point on the sample. When the probe touches the sample, and good ohmic contact is established, the current starts to flow between the sample and the probe needle. When the stable current is detected, the probe is stopped.

These methods only allow obtaining either mechanical or electrical contact between a probe and a sample without assessing its parameters. They do not handle the second phase of probe landing, which is contact maintenance that is an important feature when designing an efficient and robust automated probing system.

Solutions of automated probe landing based on force control do not necessarily have to be equipped with a sensor providing continuous force measurement. Interesting alternatives are constant force mechanisms (CFM). For instance, in the document from Q. Xu. et al., "*Design and simulation of a passive-type constant force MEMS microgripper*", 1-6, 2018, the authors present a flexure-based micro-gripper that maintains a constant force/displacement characteristic over the working space. In the case of probe landing, the use of such a mechanism ensures that the contact force will not exceed a certain level, even if the arm continues lowering. The advantage of such a solution is that the system does not require the displacement sensor, and its behavior is tuned only by mechanical parameters of the mechanism. However, CFM has some weaknesses: firstly it is not suitable for applications where force characterization is needed and secondly the CFM also does not allow contact detection.

Alternatively, the development of Atomic Force Microscopy (AFM) is particularly relevant for force measurements in micro/nanoscale operations. In these microscopes, the sample is scanned line by line by sliding ultrasensitive probes on the surface and creating a topology image of the specimen. In the document from H. Hashimoto et al., "*Two-dimensional fine particle positioning under an optical microscope using a piezoresistive cantilever as a manipulator*", 1, 09, 2000, the piezo-resistive cantilever from AFM is used as a probe controlled in a closed loop with force feedback. However, applications based on probes dedicated to AFM are not directly compatible with standard probe needles used for instance in electrical or mechanical probing.

Another vast group of force sensors in micro/nano-applications are microelectromechanical systems (MEMS). These mechanisms are usually deployed at the tip of the manipulator's arm. They consist of an integrated probe needle, a compliant frame, sensing part and optionally actuators allowing for fine movement of the probe. In the document from S. Muntwyler et. al, "*Monolithically integrated two-axis micro tensile tester for the mechanical characterization of microscopic samples*", Journal of Microelectromechanical Systems, 19, 5, 1223-1233, 2010, the mechanism contains capacitive sensors allowing displacement measurements with single nanometer precision. In addition, the same structures are used to actuate the probe using electrostatic forces between the capacitor's plates. MEMS gives very satisfying results in terms of precision, sensitivity and force range, but the user is limited by a probe needle integrated within the MEMS. That limitation becomes an important disadvantage in case of multi-scaled applications or when the probe gets damaged or contaminated. Additionally, the measurement range provided by MEMS is often strictly limited by the size of the mechanism, which may be a problem while switching from nano- to microprobe.

Another group of sensors used for sub-millinewton force measurements is optical based solutions. Light interferometry is widely used in applications demanding very precise displacement measurements. In principle, the light beam transported through an optical fiber reflects from the measured object and goes back to the interferometer for further analysis. Relatively small dimensions of optical fibers make the solution very compact so that it can be used in thin needle structures. The optical methods are superior to previously mentioned sensors in terms of signal-to-noise ratio (SNR) and insensitivity to the environmental factors, for instance, vacuum or electric field. On the other hand, they require a sensitive signal conditioner and an optical fiber integrated into a custom probe needle which is less flexible than electrical connections.

Overall, when it comes to micro/nano-applications for sub-millinewton force measurements, the existing technologies do not provide satisfying solutions notably because they require the use of a specific needle or because they imply handling complex instruments limited to specific applications.

Therefore, there is a need for a device easier to use and to manufacture, adaptable and compatible with conventional probe needle rather than requiring specific needles.

SUMMARY OF THE INVENTION

The above problems are solved by the device and the method according to the present invention.

The invention concerns a device for measuring a contact force exerted by a probe on an object, the device comprising:
- a lever and said probe, said probe being fixed to the lever and being designed for contacting the object,
- the lever being pivotably coupled to a body by coupling means,
- a fixed frame coupled to the body, the fixed frame being immobile with respect to the object, said body being designed to be moved with respect to the object so as to put the probe in contact with the object to create a contact force, said contact force thereby pivoting said lever with respect to the body around a pivot axis, a sensor for measuring the displacement of the lever with respect to the body upon pivoting, the device being characterized in that the coupling means comprise control stiffness means adapted to control, in other words to tune, the rotational stiffness of the lever, preferably during its pivoting, around the pivot axis, so that when the probe contacts the object, the displacement of the lever measured by the sensor is proportional to the contact force exerted by the probe on the object, in other words to proportional to the force between the probe and the object.

The claimed device comprises a probe mounted on a lever and designed for contacting an object. The lever is an amplification lever allowing to amplify the displacement proportional to the contact force between the probe and the object. When the probe contacts the object, a force is created between the object and the probe named contact force. The contact force imposes a torque to pivot the lever with respect to the body around a pivot axis. The invention allows to impose a known precise force to an object.

Upon contact with the probe, the lever pivots about the pivot axis and this pivoting is measured by a sensor. In other words, the contact between the object and the probe triggers the pivoting motion of the lever. The sensor permits to measure a displacement induces by the lever's pivoting. Thus, the device allows converting the contact force into a displacement, so as to detect and quantify the contact force between the object and the probe.

The device comprises control stiffness means for controlling the stiffness of the lever during its pivoting. The control stiffness means aim at minimizing the rotational stiffness of the lever so that, upon contact between the probe and the object, there is an improved correlation between the pivoting of the lever and the displacement measured by the sensor. Controlling the stiffness provides a device with an improved accuracy and sensitivity. As the stiffness of the mechanism is reduced, the displacement due to a given force increases and this enhances the sensitivity of our device. Advantageously, the device becomes less noise immune.

Control stiffness means also provide a modifiable signal to noise ratio (SNR) compared to devices that do not comprise control stiffness means. Preferably, said signal to noise ratio is improved.

Advantageously, the control stiffness means are arranged for achieving pivoting of the lever with zero stiffness during the pivoting. In the present invention, "zero stiffness" means a stiffness inferior to a few nN/m range, for instance below 5 nN/m.

Contrary to the known solutions, the device according to the present invention is adaptable on various objects: from millimeter to micro or nanometer dimensions, biological samples, semiconductor element, wafer, micromechanics pieces such as components of a watch movement, biological material.

In an embodiment, the control stiffness means comprise at least an actuator and at least an elastic element said actuator controlling, other words modifying, the stiffness of said elastic element. Thus, the rotational stiffness of the lever can be tuned by operating the actuator.

According to an embodiment, the control stiffness means comprise at least one module, each module comprising at least one actuator and at least one elastic element. The module is coupled to the body on one hand and on the other hand to the lever. If the device comprises two or more modules, each module can be positioned to actuate a distinct portion of the lever. Each module contributes to the regulation of the rotational stiffness of the lever.

For instance, if the control stiffness means comprise two modules or more, each module can be set up independently thereby increasing the stiffness setup range of the device, allowing a more accurate setup.

In an embodiment, the actuator is chosen among piezo electric actuator, electrostatic actuator, comb drive actuator, electro-thermal actuator, magneto-elastic actuator, voice coil actuator, mechanical actuator, and a combination thereof.

According to an embodiment, the elastic element is chosen among spring, pre-loaded spring, leaf spring, blade and a combination thereof.

In an embodiment, the lever is statically balanced so that its center of mass lies on the pivoting axis. In other words, the center of mass of the lever lies on the pivot axis so that the lever is insensitive to gravity or linear accelerations.

In an embodiment, the force is in the nano-Newton range. This can be applied to for example to electrical contact characterization, nano structures characterization, biological materials or chemical compounds analysis.

In an embodiment, the body is actuated with respect to the fixed frame by a second actuator for moving the body with respect to the fixed frame, for instance in translation along an axis extending in the direction of the gravity. Thus the fixed frame is movable with respect to the body to adjust the position of the said fixed frame with respect to the object.

According to an embodiment, the device further comprises a second sensor for indicating the position of the body with respect to the fixed frame.

In an embodiment, the sensor comprises a first mark on the lever and a second mark on the body, the position of the first mark with respect to the second mark indicating the relative position of the lever with respect to the body, so that, when the probe is contacting the object, the main lever is pivoting around the pivot axis, said pivoting motion inducing a displacement of the first mark of the lever with respect to the second mark, said displacement being proportional to the contact force exerted by the probe on the object. Advantageously, monitoring the displacement between the first mark and the second mark can be achieved via image processing techniques.

According to an embodiment, the sensor is chosen amongst optical sensor, electro static sensor, voice coil sensor, electro thermal sensor, electromagnetic sensor, piezo electric sensor and a combination thereof.

In an embodiment, the elastic element comprises an elastic element having more than one stable state, preferably bistable elastic element. Such elastic elements are designed for switching at least from a first position to a second position (i.e. at least two stable positions) when the contact force exceeds a determined threshold. These elastic elements allow protecting fragile object.

According to an embodiment, the device is a load cell.

In an embodiment, the device is at least partially made of conductive or semi conductive material.

According to an embodiment, the device is made of a material compatible with microfabrication techniques, for instance, silicon or fused silica for instance glass.

The invention also concerns a method for measuring a contact force exerted by a probe on an object, the method comprising:
i) providing a device according to the invention;
ii) moving the body with respect to the object so as to put the probe in contact with the object to create a contact force, said contact force thereby pivoting said lever with respect to the body around a pivot axis;
iii) measuring the displacement of the sensor induced by the pivoting of the lever;

iv) determining the contact force exerted by the probe on the object based on the displacement measured by the sensor;

In this method, the device is in a passive mode, meaning that device is passive and does not exert a force on the sample. In other words, the deflection amplitude of the lever correlates with the contact force between the probe and the object.

Advantageously, the claimed device also allows to detect contact between the probe and the object when the sensor shows a displacement of the lever.

The invention further concerns a method for maintaining a contact force between a probe and an object, the method comprising:
i) providing a device according to the present invention, wherein the control stiffness means comprise at least an actuator and at least an elastic element, the actuator controlling the stiffness of the elastic element,
ii) moving the body with respect to the object so as to put the probe in contact with the object to create a contact force, said contact force thereby pivoting said lever with respect to the body around a pivot axis;
iii) when the probe is in contact with the object, actuating the actuator of the coupling means to create a balance force counteracting the contact force thereby maintaining the contact between the probe and the object;

The particular advantages of the methods are similar to the ones of the device of the invention and will thus not be repeated here.

This method addresses the issue of maintaining contact between the probe and the object. To that end, the device is in an active mode: the actuator of the actuation means actuates the lever to counterbalance the contact force. This method is particularly advantageous when it comes to maintain the contact between the probe and a fragile object, for instance.

In an embodiment, the elastic elements have more than one stable state, said elastic element being arranged for switching at least from a first stable position to a second stable position when the contact force exerted on the probe exceeds a threshold, so that when the contact force between the probe and the object exceeds the threshold, the elastic element switches from the first stable position to the second stable position, the lever acting as a balance to maintain the contact between the probe and the object. The contact force is limited by a threshold corresponding to the maximum of the contact force between the probe and the object. The control stiffness means can be tuned to adjust the threshold depending on the object. Elastic elements with more than one stable state are advantageous since the contact between the object and the probe is maintained between the various stable states. The advantage of multistable elastic elements, i.e. multistable pivots, is overload protection of both the probe and the object to be measured.

According to an embodiment, the control stiffness means are arranged for adjusting the stiffness of the coupling means when the actuator is actuated to create the balance force, so as to maintain a constant contact force between the probe and the object over a determined movement of the lever. In this embodiment, the control stiffness is arranged for adapting the balance force to the contact force to ensure a constant force between the object and the probe.

In an embodiment, wherein the method comprises, prior to step ii), a step of operating the control stiffness means to set a determined stiffness.

The embodiments describe for the device also apply to the methods according to the present invention mutatis mutandis and vice versa.

BRIEF DESCRIPTION OF THE DRAWINGS

Further particular advantages and features of the invention will become more apparent from the following non-limitative description of at least one embodiment of the invention which will refer to the accompanying drawings, wherein.

DETAILED DESCRIPTION OF THE INVENTION

The present detailed description is intended to illustrate the invention in a non-limitative manner since any feature of an embodiment may be combined with any other feature of a different embodiment in an advantageous manner.

Figure 1:
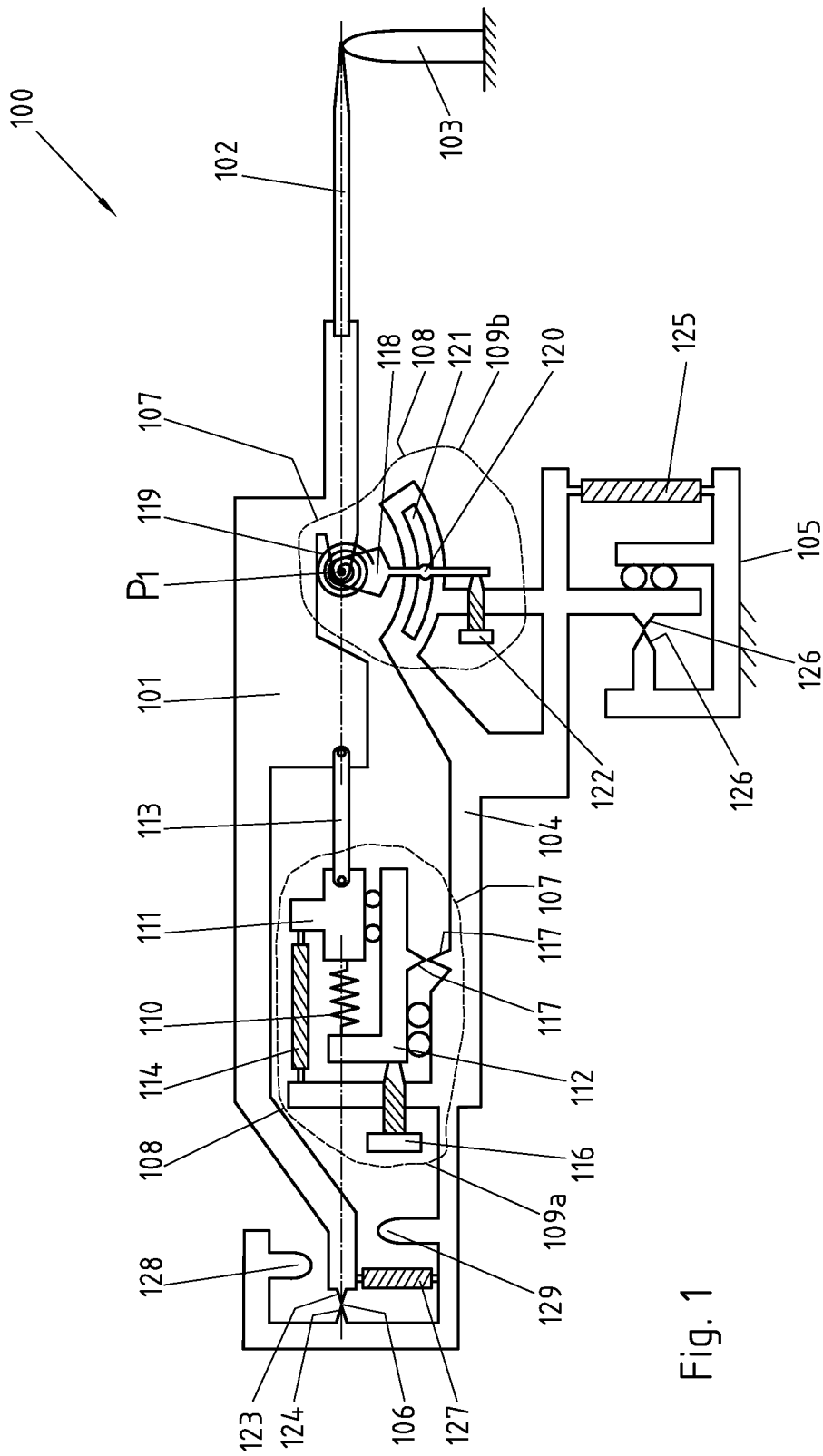
FIG. 1 represents a first embodiment of the device according to the invention.
Figure 2:
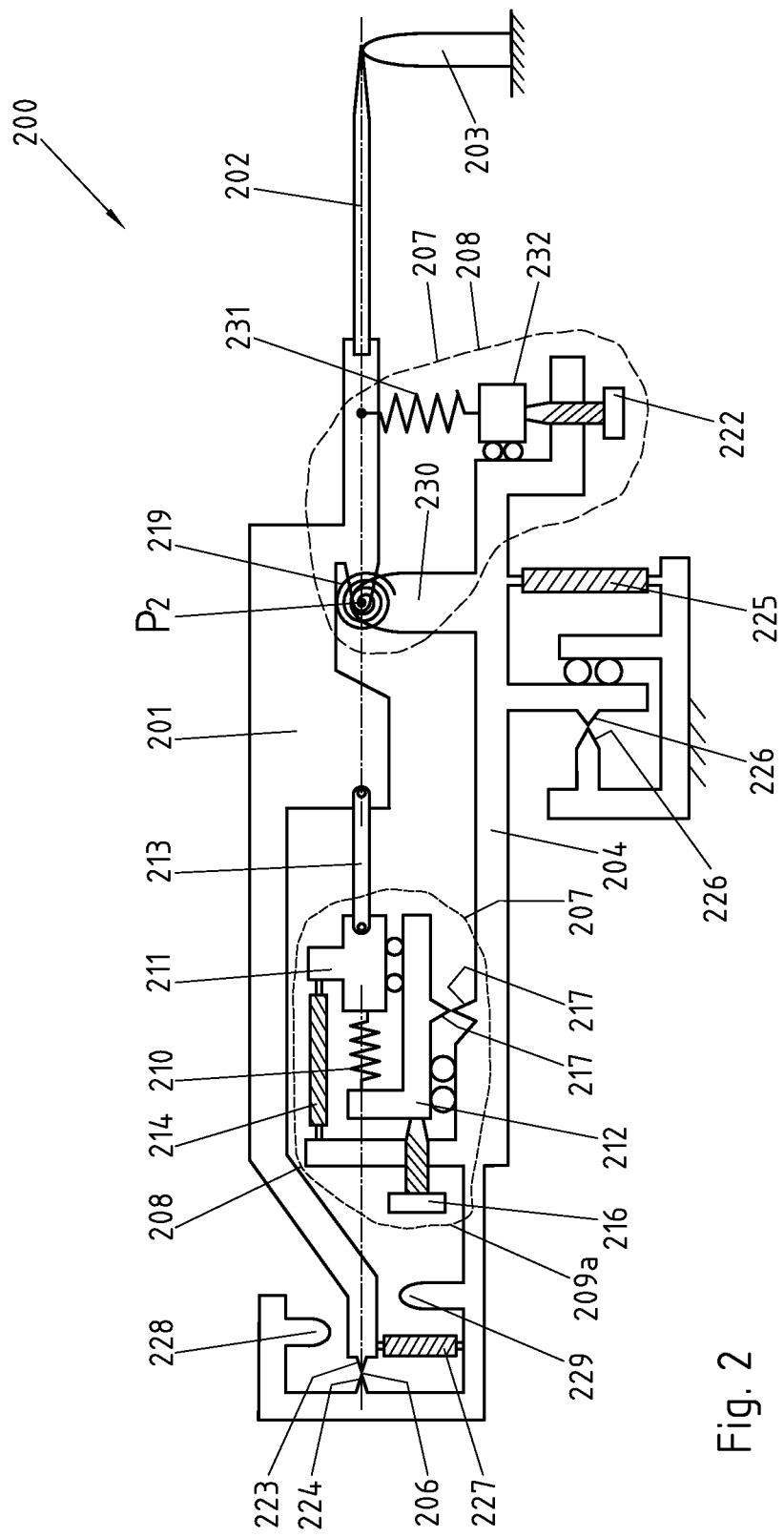
FIG. 2 represents a second embodiment of the device according to the invention.
Figure 3:
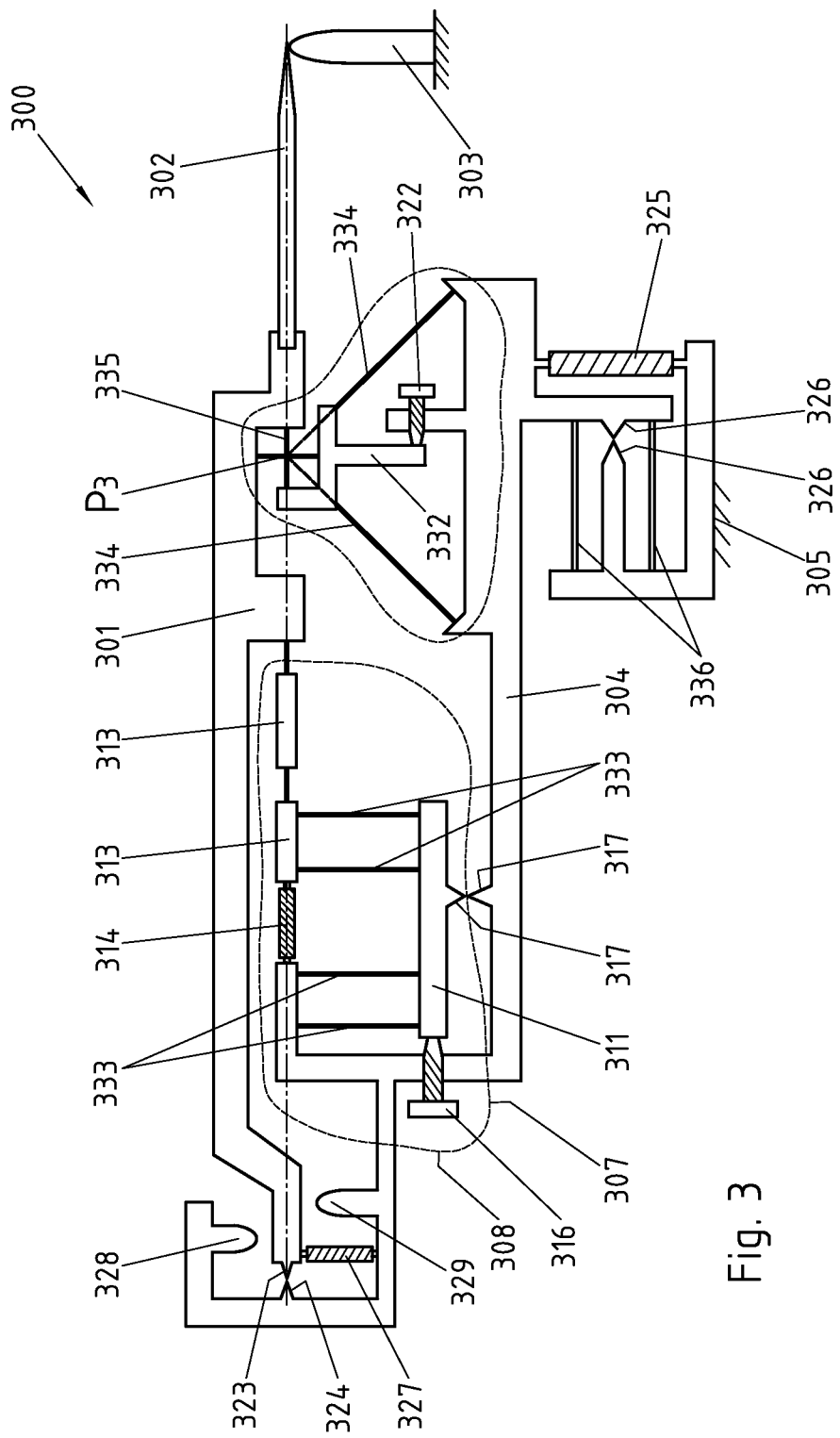
FIG. 3 represents a third embodiment of the device according to the invention.

FIGS. 1 to 3 represent various embodiments of a device 100,200,300 according to the present invention. First, a general description of the device 100,200,300 will be provided, before describing each embodiment in details.

The device 100,200,300 comprises a lever 101,201,301 with a probe 102,202,302 fixed thereon, said probe being designed for contacting an object 103,203,303 and exerted a force on it, named contact force. The lever 101,201,301 is pivotably coupled to a body 104,204,304 said body being coupled to a fixed frame 105,205,305. The body 104,204, 304 and the lever 101,201,301 are moveable with respect to the fixed frame 105,205,305 whereas said the fixed frame is immobile with respect to the object 103,203,303.

The body 104,204,304 is designed for being moved with respect to the object 103,203,303 to put the probe 102,202, 302 in contact with said object. When the probe 102,202,302 contacts the object 103,203,303 the lever 101,201,301 pivots around a pivot axis P1,P2,P3 with respect to the body 104,204,304. The displacement of the lever 101,201,301 is measured by a sensor 106,206,306 said displacement allowing to compute the contact force exerted by the probe 102,202,302 on the object 103,203,303. The pivoting of the lever 101,201,301 with respect to the body 104,204,304 is ensured by coupling means 107,207,307. The coupling means 107,207,307 further comprises control stiffness means 108,208,308 to control the stiffness of the lever 101,201,301 during pivoting. The stiffness means can be organized in modules, each modules contributing to the stiffness of the lever, in other words to the overall stiffness of the lever.

In the embodiment represented in FIG. 1, the control stiffness means 108 of the coupling means 107 are organized in two modules 109: a first module 109a coupling the central portion of the lever 101 with the body 104, and a second module 109b coupling the distal portion of the lever 101, i.e. in proximity of the probe 102, with the body 104.

The first module 109a comprises a preload spring 110, acting as an elastic element, and two slides 111,112 (or sliding blocks), each extremity of said spring 110 being attached to one slide 111,112, the spring 110 being designed for modulating the distance between the slides 111,112. One of said slide 111 is attached to the body 104, the other one being attached to the lever 101 via a link arm 113 so that the compression/decompression of the spring 110 modulates the distance between the lever 101 and the body 104. Each slide 111,112 is actuated by an actuator 114 fixed on the body 104: the slide 111 is actuated by a piezoelectric actuator 115 whereas the slide 112 is actuated by a screw 116. The rotational stiffness of the lever can be tuned by setting the actuators 114 of the first module 109*a*.

The first module 109*a* further comprises a stiffness sensor 117 for indicating the stiffness of the first module 109*a*.

The second module 109*b* comprises a finger 118 attached both on the lever and on the body 104:

The finger 118 is coupled to the lever 101 on a pivot point of the pivot axis P1 via a spiral spring 119 whose extremities are fixed respectively on said finger and on said lever;

The finger 118 comprises a pin 120 received in a guide 121 of the body 104, the second module 109*b* comprising a screw 122 screwed in the body 104 for actuating the displacement of the pin of the finger in the guide 121;

Actuation of the screw 122 drives the displacement of the pin 120 in the guide 121 to charge or discharge the spiral spring so as to modulate the stiffness of the second module 109*b*.

The sensor 106 of the device 100 comprises a first mark 123 on the lever 101 and a second mark 124 on the body 104, the position of the first mark 123 with respect to the second mark 124 indicating the relative position of the lever 101 with respect to the body 104. For instance, when the first mark 123 is aligned with the second mark 124, there is no force exerted by the probe 102 on the object 103. When the probe 102 contacts the object 103, the pivoting of the lever 101 induces a shift or displacement of the first mark 123 with respect to the second mark 124.

In the first embodiment, the device 100 further comprises a second actuator 125 for actuating the body 104 with respect to the fixed frame 105, for instance, a piezo electric actuator. The device 100 further comprises a second sensor 126 for indicating the position of the body 104 with respect to the fixed frame 105. In the present embodiment, the second sensor 126 is similar to the sensor 106.

The device 100 can operate on two modes, a passive mode and an active mode.

In passive mode, the body 104 is moved by the coupling means 107 to put the probe 102 in contact with the object 103 and create the contact force. For instance, the second actuator 125 is actuated to move the body with respect to the object (and with respect to the fixed frame 105). This displacement is indicated on the second sensor 126. The contact between the probe 102 and the object 103 drives the pivoting of the lever 101 around the pivot point of the pivot axis P1, said pivoting inducing a displacement of the first mark 123 with respect to the second mark 124 proportional to the contact force between the probe 102 and the object 103.

In the active mode, the coupling means 107 are arranged to actuate the lever 101 with a balance force to counteract the contact force. For instance, in this embodiment, the coupling means 107 further comprise an additional actuator 127 for actuating the lever 101 with a balance force. Alternatively, actuators form the first and/or second modules can also be used.

The device 100 further comprises two stoppers 128,129 to limit the motion of displacement of the lever 101. This feature is also present in the embodiments represented in FIGS. 2 and 3.

FIG. 2 represents a device 200 according to a second embodiment. The features of the device 200 according to the second embodiment already describe for the device 100 according to the first embodiment will not be repeated here below.

The main difference between the device 100 represented in FIG. 1 and the one of FIG. 2 concerns the second module 209*b* of the coupling means 209. The second module comprises:

a protrusion 230 extending from the body 204 toward the lever 201 said protrusion being attached to the lever 201 on a pivot point P2 with a spiral spring;

a preload spring 231 whose extremities are respectively attached to the lever 201 and to a base 232 coupled to the body, said base being mobile with respect to the body and actuated by a screw to charge or discharge said preloaded spring 231;

The stiffness of the second module 209*b* can be tuned by actuating the screw 222 of the second module 209*b*.

Upon contact between the probe 102 and the object 103, the lever 101 pivots about the pivot axis P1.

The device 200 can be operated either in active or in passive mode similarly to the device 100 according to the first embodiment.

Upon contact between the probe 202 and the object 203, the lever 201 pivots about the pivot point P2.

FIG. 3 represents a device 300 according to a third embodiment. The features of the device 300 (according to the third embodiment) already describe for the device 100 or 200 (according to the first or second embodiment) will not be repeated here below.

The control stiffness means 308 of the device 300 comprise a first module 309*a* and a second module 309*b*.

The first module 309*a* comprises a slide 311 attached to:

The body 304 via two blades 333;

A link arm 313 via two other blades 333, said link arm 313 being connected to the lever;

The first module 309*a* further comprising an actuator 314 and a screw 316 for charging/discharging the load of the blades thereby modulating the stiffness of the first module 309*a*.

The second module 309*b* is also based on the blade's coupling similarly to the first module 309*a*. The second module 309*b* comprises a base 332 suspended between the body 304 and the lever 301 by blades 334, wherein the base being attached to:

the lever 301 on a pivot point P3 with crossed blades 335;

the body 304 by two blades 334;

The second module 309*b* further comprises a screw 322 screwed in the body 304 for displacing the base 332 and thus charge or discharge the load of the blades 334,335 thereby modulating the stiffness of the second module 309*b*.

In device 300, the body 304 is coupled to the fixed frame with additional blade 336 to facilitate the positioning of the body 304 with respect to the fixed frame 305. While the embodiments have been described in conjunction with a number of embodiments, it is evident that many alternatives, modifications, and variations would be or are apparent to those of ordinary skill in the applicable arts. Accordingly, this disclosure is intended to embrace all such alternatives, modifications, equivalents, and variations that are within the scope of this disclosure. This for example particularly the case regarding the different apparatuses which can be used.

REFERENCE NUMBERS

100 Device according to a first embodiment
101 lever
102 probe
103 object 104 body
105 Fixed frame
106 Sensor
107 Coupling means
108 Control stiffness means
109a First module of the coupling means
109b Second module of the coupling means
110 Preload spring
111 Slide of the first module
112 slide of the first module
113 link of the first module
114 actuator of the first module
115 Piezo electric actuator of the first module
116 Screw of the first module
117 Stiffness sensor of the first module
118 finger of the second module
119 Spiral spring of the second module
120 Pin of the finger
121 Guide of the pin
122 Screw of the second module
123 First mark of the sensor
124 second mark of the sensor
125 Second actuator
126 Second sensor
127 Additional actuator
128 stopper
129 stopper
200 Device according to a second embodiment
201 lever
202 probe
203 object
204 body
205 Fixed frame
206 Sensor
207 Coupling means
208 Control stiffness means
209a First module of the coupling means
209b Second module of the coupling means
210 Preload spring of the first module
211 Slide of the first module
212 slide of the first module
213 link of the first module
214 actuator of the first module
215 Piezo electric actuator of the first module
216 Screw of the first module
217 Stiffness sensor of the first module
219 Spiral spring of the second module
222 Screw of the second module
223 First mark
224 second mark
225 Second actuator
226 Second sensor
227 Additional actuator
228 Stopper
229 Stopper
230 Protrusion of the second module
231 Preloaded spring of the second module
232 Base of the second module
300 Device according to a third embodiment
301 lever
302 probe
303 object
304 body
305 Fixed frame
306 Sensor
307 Coupling means
308 Control stiffness means
309a First module of the coupling means
309b Second module of the coupling means
311 Slide of the first module
313 Link arm of the first module
314 Actuator of the first module
316 Screw of the first module
317 Stiffness sensor of the first module
322 Screw of the second module
323 First mark of the sensor
324 second mark of the sensor
325 Second actuator
326 Second sensor
327 Additional actuator
328 stopper
329 stopper
332 Base of the second module
333 Blade of the first module
334 Blades of the second module
335 Crossed blades of the second module
336 Additional blades

The invention claimed is:

1. Device for measuring a contact force exerted by a probe on an object, the device comprising:
a lever and the probe, the probe being fixed to the lever and being designed for contacting the object,
the lever being pivotably coupled to a body by a coupling module,
a fixed frame coupled to the body, the fixed frame being immobile with respect to the object,
the body being configured to be movable with respect to the object so as to put the probe in contact with the object to create a contact force, the contact force thereby pivoting the lever with respect to the body around a pivot axis, and
a sensor for measuring displacement of the lever with respect to the body upon pivoting,
wherein the coupling module comprise a control stiffness module configured to tune a rotational stiffness of the lever around the pivot axis, and when the probe contacts the object, the displacement of the lever measured by the sensor is proportional to the contact force between the probe and—the object.

2. Device according to claim 1, wherein the control stiffness module comprises at least an actuator and at least an elastic element, the actuator modifying a stiffness of the elastic element.

3. Device according to claim 2, wherein the actuator is chosen among piezo electric actuator, electrostatic actuator, comb drive actuator, electro-thermal actuator, magneto-elastic actuator, voice coil actuator, mechanical actuator, and a combination thereof.

4. Device according to claim 2, wherein the elastic element is chosen among spring, pre-loaded spring, leaf spring, blade, and a combination thereof.

5. Device according to claim 2, wherein the elastic element comprises at least one elastic element having more than one stable state.

6. Device according to claim 1, wherein the contact force is in a nano-Newton range.

7. Device according to claim 1, wherein the lever is statically balanced so that a center of mass of the lever lies on the pivot axis.

8. Device according to claim 1, wherein the body is actuated with respect to the fixed frame by a second actuator for moving the body with respect to the fixed frame.

9. Device according to claim 1, wherein the device is a load cell.

10. Method for measuring the contact force exerted on by the probe on the object, the method comprising:
  i) providing the device according to claim 1;
  ii) moving the body with respect to the object so as to put the probe in contact with the object to create the contact force, the contact force thereby pivoting the lever with respect to the body around the pivot axis;
  iii) measuring the displacement of the sensor induced by the pivoting of the lever; and
  iv) determining the contact force exerted by the probe on the object based on the displacement measured by the sensor.

11. Method according to claim 10, wherein the method comprises the step of:
  prior to step ii), operating the control stiffness module to set a determined rotational stiffness of the lever.

12. Method for maintaining the contact force between the probe and the object, the method comprising:
  i) providing the device according to claim 1, wherein the control stiffness module comprises at least an actuator and at least an elastic element, the actuator controlling a stiffness of the elastic element,
  ii) moving the body with respect to the object so as to put the probe in contact with the object to create the contact force, the contact force thereby pivoting the lever with respect to the body around the pivot axis; and
  iii) when the probe is in contact with the object, actuating the actuator of the control stiffness module to create a balance force counteracting the contact force thereby maintaining the contact between the probe and the object.

13. Method according to claim 12, wherein the elastic element has more than one stable state, the elastic element being arranged for switching at least from a first stable position to a second stable position when the contact force exerted on the probe exceeds a threshold, so that when the contact force between the probe and the object exceeds the threshold, the elastic element switches from the first stable position to the second stable position, the lever acting as a balance to maintain the contact between the probe and the object.

14. Method according to claim 12, wherein the control stiffness module is arranged for adjusting a stiffness of the coupling module when the actuator is actuated to create the balance force, so as to maintain a constant contact force between the probe and the object over a determined movement of the lever.

15. Method according to claim 12, wherein the method comprises the step of:
  prior to step ii), operating the control stiffness module to set a determined rotational stiffness of the lever.

* * * * *